(12) United States Patent
Matsuzawa et al.

(10) Patent No.: US 8,095,810 B2
(45) Date of Patent: Jan. 10, 2012

(54) STORAGE SYSTEM AND POWER CONSUMPTION REDUCTION METHOD FOR THE SAME

(75) Inventors: Keiichi Matsuzawa, Yokohama (JP); Takahiro Nakano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 824 days.

(21) Appl. No.: 12/073,946

(22) Filed: Mar. 12, 2008

(65) Prior Publication Data

US 2009/0193272 A1 Jul. 30, 2009

(30) Foreign Application Priority Data

Jan. 24, 2008 (JP) ................................. 2008-013865

(51) Int. Cl.
*G06F 1/26* (2006.01)
*G06F 1/00* (2006.01)
*G06F 12/00* (2006.01)
*G06F 15/16* (2006.01)
*G06F 15/00* (2006.01)
*G06F 11/00* (2006.01)

(52) U.S. Cl. ........ 713/320; 713/300; 707/831; 709/201; 709/208; 711/112; 712/28; 714/2

(58) Field of Classification Search .................. 713/300, 713/320; 707/831; 709/201, 208; 711/112; 712/28; 714/2
See application file for complete search history.

(56) References Cited

U.S. PATENT DOCUMENTS

| | | | |
|---|---|---|---|
| 7,543,166 B2 * | 6/2009 | Zimmer et al. ............... | 713/310 |
| 7,814,364 B2 * | 10/2010 | Sankaran et al. .................. | 714/4 |
| 2003/0135578 A1 | 7/2003 | Banga et al. | |
| 2005/0060590 A1 * | 3/2005 | Bradley et al. ............... | 713/320 |
| 2005/0210074 A1 | 9/2005 | Nakatani et al. | |
| 2005/0246393 A1 | 11/2005 | Coates et al. | |
| 2007/0174658 A1 | 7/2007 | Takamoto et al. | |
| 2008/0010234 A1 | 1/2008 | Nakagawa et al. | |
| 2008/0104587 A1 * | 5/2008 | Magenheimer et al. .......... | 718/1 |
| 2008/0295096 A1 * | 11/2008 | Beaty et al. ....................... | 718/1 |

FOREIGN PATENT DOCUMENTS

| | | |
|---|---|---|
| EP | 1578088 A2 | 9/2005 |
| EP | 1808758 A2 | 7/2007 |
| JP | 2005-267327 | 3/2004 |
| JP | 2007-148839 | 11/2005 |

\* cited by examiner

*Primary Examiner* — Stefan Stoynov
(74) *Attorney, Agent, or Firm* — Volpe and Koenig, P.C.

(57) ABSTRACT

In a storage system that includes two or more file servers each including an arbitrary number of operating virtual file servers, a management server: holds a load information table regarding a load on each virtual file server for each time period and redundancy information table for the storage system; judges, with reference to the load information table and redundancy information table, whether or not the loads on the virtual file servers can be handled by a smaller number of file servers than the number of currently-operating file servers; selects, if the judgment result is positive, a power-off target file server and makes another file server fail over a virtual file server in the power-off target file server; and turns off the power-off target file server.

19 Claims, 18 Drawing Sheets

FIG.5

| VIRTUAL FILE SERVER NAME | TIME PERIOD | LOAD |
|---|---|---|
| VNAS1 | 6:00~21:00 | 80% |
|  | 21:00~6:00 | 40% |
| VNAS2 | 7:00~22:00 | 70% |
|  | 22:00~7:00 | 30% |
| VNAS3 | 6:00~21:00 | 30% |
|  | 21:00~6:00 | 0% |
| VNAS4 | 0:00~24:00 | 70% |

FIG.6A

| RESOURCE NAME | MINIMUM VALUE | CURRENT VALUE | MAXIMUM VALUE |
|---|---|---|---|
| NUMBER OF FILE SERVERS | 2 | 3 | 4 |
| NUMBER OF NETWORK PORTS IN EACH FILE SERVER | 5 | 5 | 5 |
| TOTAL NUMBER OF NETWORK PORTS IN ALL FILE SERVERS | 10 | 13 | 20 |
| NUMBER OF STORAGE APPARATUSES | 5 | 7 | 10 |

FIG.6B

| VIRTUAL FILE SERVER NAME | MAXIMUM VALUE |
|---|---|
| VNAS1 | UNLIMITED |
| VNAS2 | 2 |
| VNAS3 | 2 |
| VNAS4 | 1 |

FIG.15

REDUNDANCY INFORMATION LIST    1205

| RESOURCE NAME | MINIMUM VALUE | CURRENT VALUE | MAXIMUM VALUE |
|---|---|---|---|
| NUMBER OF FILE SERVERS | 2 | 3 | 4 |
| NUMBER OF NETWORK PORTS IN EACH FILE SERVER | 5 | 5 | 5 |
| TOTAL NUMBER OF NETWORK PORTS IN ALL FILE SERVERS | 10 | 13 | 20 |
| NUMBER OF STORAGE APPARATUSES | 5 | 7 | 10 |

1200

1210A ●
1210B ○
1210C ○
1210D ○

( ADD )    ( CHANGE )    ( DELETE )
1215      1220      1225

STORAGE SYSTEM AND POWER CONSUMPTION REDUCTION METHOD FOR THE SAME

CROSS-REFERENCES TO RELATED APPLICATIONS

This application relates to and claims priority from Japanese Patent Application No. 2008-013865, filed on Jan. 24, 2008 the entire disclosure of which is incorporated herein by reference.

BACKGROUND

1. Field of the Invention

The invention relates generally to a storage system and a power consumption reduction method for the storage system, and in particular, the invention is suitable for use in a storage system in which plural file servers, each having virtual file servers set therein, constitute a cluster, and a power consumption reduction method for such a storage system.

2. Description of Related Art

In conventional computers, one file server provides one service. In the method proposed in reference 1, plural services can be provided by setting plural virtual file servers in one file server. This technique enables plural services to be provided by a small number of file servers and reduces the number of operating servers, so power consumption can be reduced. In the method proposed in reference 2, virtual file servers can be failed over between file servers. Reference 3 proposes, without limitation to a virtual file server itself, a method relating to the virtual server, in which a standby server is started when a failure occurs in a server and the standby server fails over a virtual file server operating in the failure-occurring server (see reference 1: US 2003/0135578, reference 2: JP2005-267327 A and reference 3: JP2007-148839 A).

Due to the above techniques disclosed in references 1 to 3, a lot of virtual file server services can be provided with a small number of file servers. However, since some virtual file servers constantly operate in each of the file servers, the file servers themselves have to constantly operate.

However, usage frequency for the file servers varies with time depending on how they are used. Accordingly, during a time period when the usage frequency is low, all file servers operate even though the function of all virtual file servers can be provided by a smaller number of file servers, so the power for all the file servers is consumed.

SUMMARY

In light of the above problems, it is an object of this invention to propose a storage system and a power consumption reduction method for the storage system that are capable of reducing power consumption during a time period when usage frequency for file servers is low.

Provided according to an aspect of this invention is a storage system that includes: at least one storage apparatus that includes a first power control mechanism; at least one computer that includes a controller for storing a file in the storage apparatus, a second power control mechanism and a virtual file server that issues start, stop and failover commands; and a power management computer that controls the first power control mechanism and the second power control mechanism, wherein the power management computer includes a first shift controller that: refers to a load on the computer; stops the virtual file server or performs failover for the virtual file server when the load is low; and shifts the states of the first power control mechanism in the storage apparatus and the second power control mechanism in the computer to a power-off state or a low power consumption state.

With this configuration, the power management computer refers to the load on the computer, stops the virtual file server or performs failover for the virtual file server when the load is low, and shifts the first power control mechanism in the storage apparatus and the second power control mechanism in the computer to a power-off state or a low power consumption state, so the power consumption of the storage system can be reduced.

Accordingly, this invention can propose a storage system and a power consumption reduction method for the storage system that are capable of reducing power consumption during a time period when the usage frequency of the file server is low.

Other aspects and advantages of the invention will be apparent from the following description and the appended claims.

BRIEF DESCRIPTION OF THE DRAWINGS

FIG. 5 is a diagram showing a practical example of a virtual file server information table according to the above embodiment of this invention.

FIGS. 6A and 6B are diagrams showing a practical example of a redundancy information table according to the above embodiment of this invention.

FIG. 15 is a diagram showing an example of a redundancy information table edit interface according to the above embodiment of this invention.

DETAILED DESCRIPTION OF PREFERRED EMBODIMENTS

An embodiment of this invention will be described below.

Figure 1:
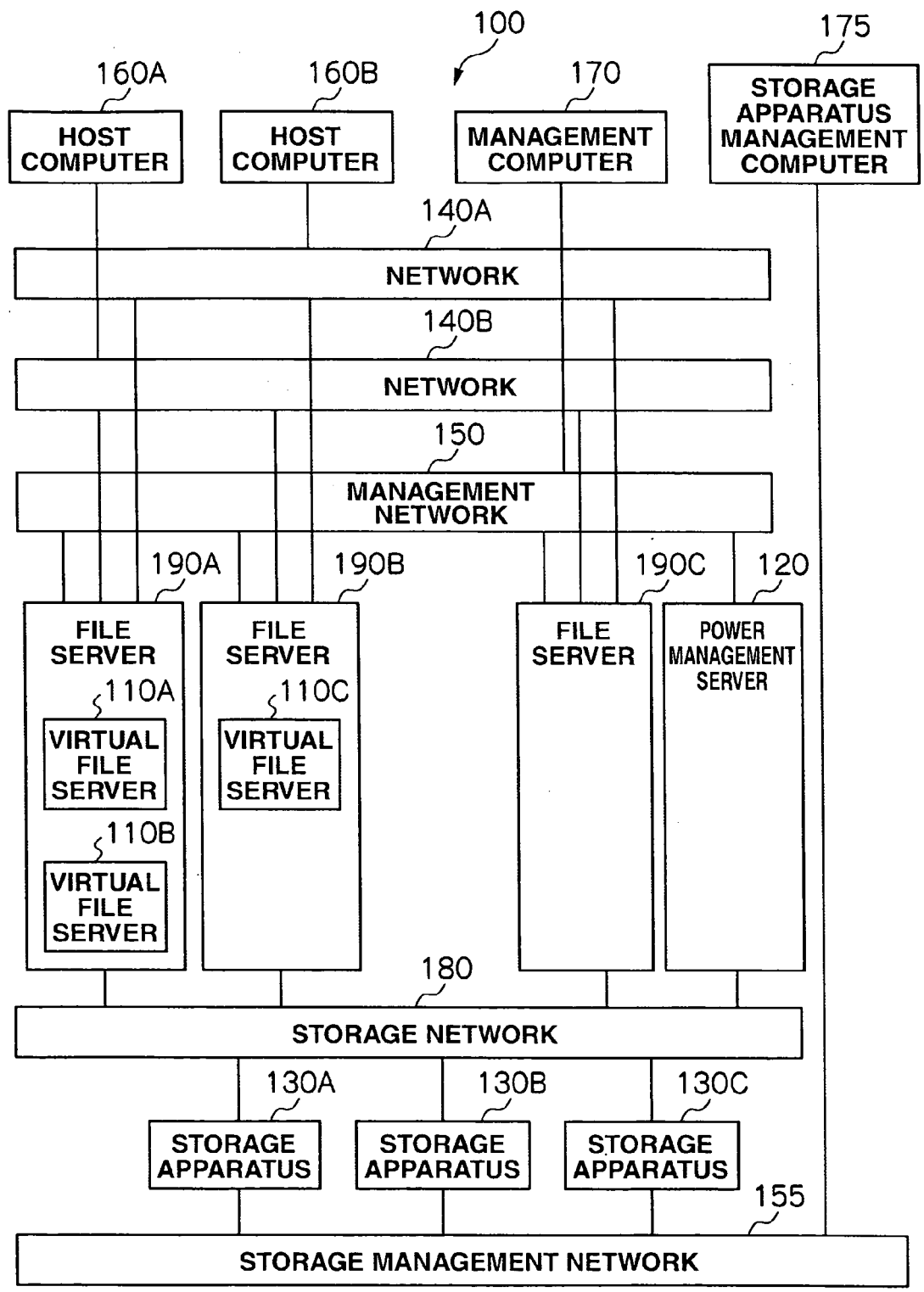
FIG. 1 is a block diagram showing an example of the configuration of a storage system according to an embodiment of this invention.

FIG. 1 is a block diagram showing a configuration example of a storage system 100, in which this invention is applied, in this embodiment. The storage system 100 includes file servers 190A to 190C, a power management server 120, storage apparatuses 130A to 130C, host computers 160A and 160B, a management computer 170 and a storage apparatus management computer 175. The file servers 190A to 190C and the storage apparatus 130A to 13C constitute a NAS (Network Attached Storage).

The file servers 190A to 190C and the power management server 120 are connected to the storage apparatuses 130A to 130C via a storage network 180. Through this connection, the file servers 190A to 190C and the power management server 120 control the transmission/reception of information stored in the storage apparatuses 130A to 130C and control the storage apparatuses 130A to 130C themselves. Each of the file servers 190A to 190C and the storage apparatuses 130A to 130C are not necessarily connected to each other via the storage network 180, and each of the file servers 190A to 190C and the storage apparatuses 130A to 130C may be directly connected to each other as is the case with DAS (Direct Attached Storage).

The file servers 190A to 190C are connected to networks 140A and 140B and a management network 150. Each of the networks 140A and 140B and the management network 150 can provide communication using a protocol, such as TCP/IP or iSCSI capable of providing communication.

In each of the file servers 190A to 190C, zero or more virtual fileservers 110A to 110C operate, and each of the file servers 110A to 110C provides a file system function for the networks 140A and 140B to which the file servers 190A to 190C are connected. This function enables the host computers 160A and 160B connected to the networks 140A and 140B to use the file system function provided by the virtual file servers 110A to 110C.

Connected to the management network 150 are the power management server 120 and the management computer 170. The power management server 120 manages power for the file servers 190A to 190C and manages the virtual file servers 110A to 110C via the management network 150. The power management server 120 is connected to the storage apparatuses 130A and 130C via the storage network 180 and manages power for the storage apparatuses 130A to 130C.

The management computer 170 manages the file servers 190A to 190C via the management network 150. The management computer 170 also communicates with the power management server 120.

Note that the power management server 120 is not necessarily independent of the file servers 190A to 190C, and one of the file servers 190A to 190C may alternatively perform processing as a replacement for the power management server 120. In addition, in a configuration in which the file server 190A, 190B or 190C serves also as the power management server 120, one constant file server does not necessarily serve as the power management server 120, but any of the file servers 190A to 190C may provide the function of the power management server 120 at any arbitrary time.

The networks 140A and 140B are not necessarily separated from the management network 150, and the file system function may be provided and managed in a common network.

In addition, the networks 140A and 140B are not necessarily provided separately from the management network 150, and the file system function may be provided and managed on a common network.

The storage systems 130A to 130C and the storage apparatus management computer 175 are connected to each other via a storage management network 155. An administrator for the storage system 100 can check or change the power supply or operation status of the storage apparatuses 130A to 130C using the storage apparatus management computer 175 via the storage management network 155. The functions of the storage apparatus management computer 175 and the management computer 170 may be provided by a common computer.

Figure 2:
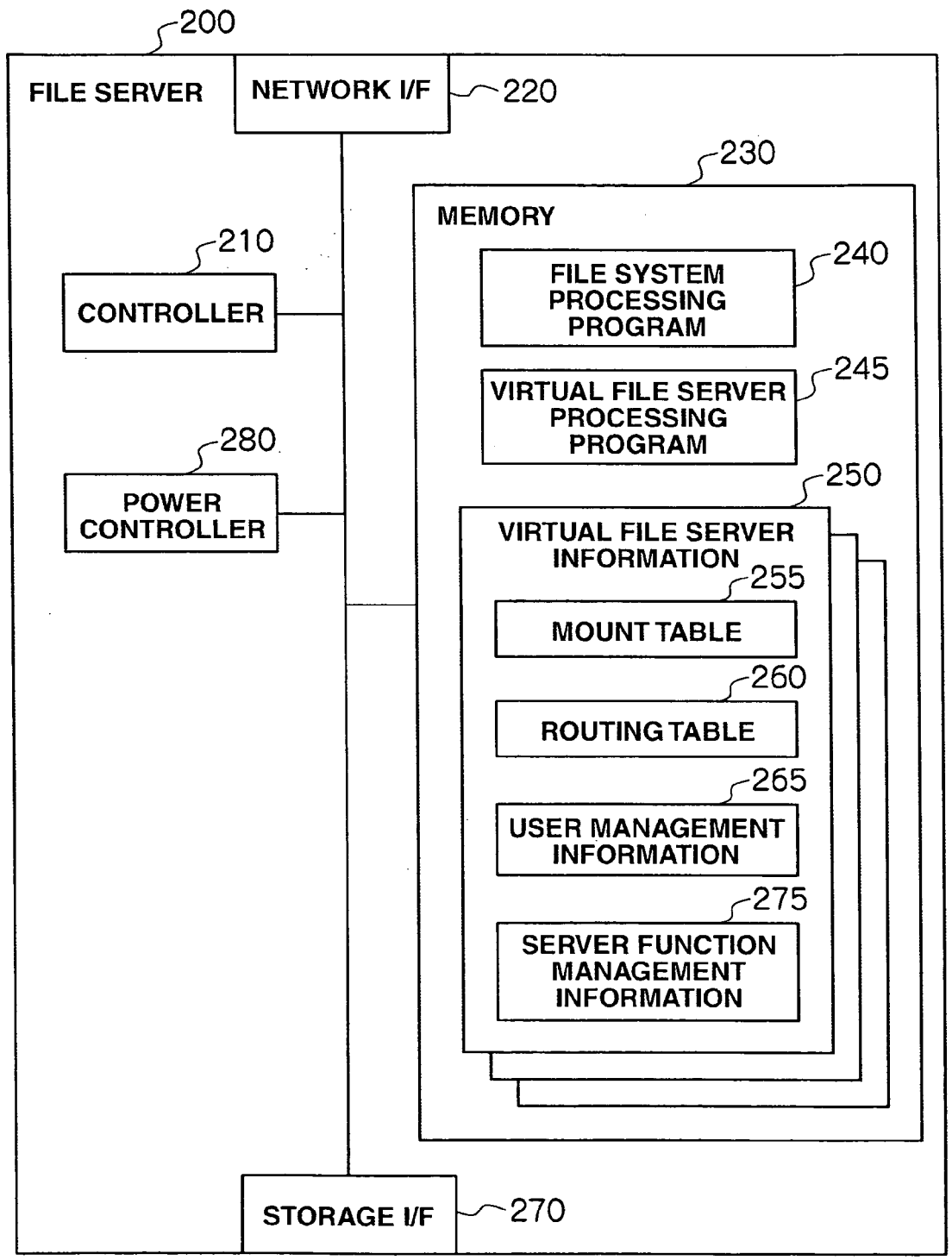
FIG. 2 is a diagram showing an example of the detailed configuration of a file server according to the above embodiment of this invention.

FIG. 2 is a diagram showing an example of the detailed configuration of the file servers 190A to 190C in this embodiment. Since the file servers 190A to 190C have a common configuration, they will be integrally described as a file server 200. Note that an arbitrary one of the file servers 190A to 190C will also be described as the file server 200 in some cases in the below description.

The file server 200 includes a controller that controls each element in the file server 200; a network interface 220 that connects the networks 140A and 140B to the management network 150; a memory 230 that stores programs and information; a storage interface 270 that connects the file server 200 to the storage apparatuses 130A to 130C via the storage network 180; and a power controller 280 that turns on or off the file server.

The memory 230 stores a file system processing program 240 for providing a file access function for the host computers 160A and 160B via the networks 140A and 140B; a virtual file server processing program 245 that enables a virtual file server function; and virtual file server information 250.

The controller 210 operates by interpreting the file system processing program 240 stored in the memory 230 and provides a file system function. The controller 210 also operates by interpreting the virtual file server processing program 245, and creates, deletes or changes the virtual file server information 250 in order to perform virtual file server control, e.g., creating, deleting, starting or stopping the virtual file servers 110A to 110C.

One virtual file server information 250 piece is stored in the memory 230 for one virtual file server 110A, 110B or 110C that operates in the file server 200. The virtual file server information 250 includes a mount table 255 that is file system configuration information that the virtual file server provides to the host computers 160A and 160B; a routing table 260 for connecting the virtual file server to the networks 140A and 140B; user management information 265 for managing users using file systems provided by the virtual file server; and server function management information 275 including other information required by the virtual file server. The mount table 255, the routing table 260, the user management information 265 and the server management function information 275 will not be shown and described in detail as they do not directly relate to this invention.

The information stored in the virtual file server information 250 is not limited to the above-described information, and information required for the virtual file server to provide the file system and information required for the management of the virtual file server may be stored as the server function management information 275.

The network interface 220 connects the file server 200 to the networks 140A and 140B and the management network 150 using a communication protocol such as the TCP/IP and the iSCSI.

The storage interface 270 connects the file server 200 to the storage network 180 and the storage apparatuses 130A to 130C using a communication protocol such as SCSI or Fibre-Channel.

The power controller 280 turns off the file server 200 when a shutdown command is issued from the controller 210. Also, when a power-on or power-off command is issued from a computer connected to the management network 150 via the network interface 220, the power controller 280 turns on or off the file server 200 in accordance with the issued command. The power-on or power-off command via the network interface 220 can be issued based on a protocol such as IPMI (Intelligent Platform Management Interface).

Figure 3:
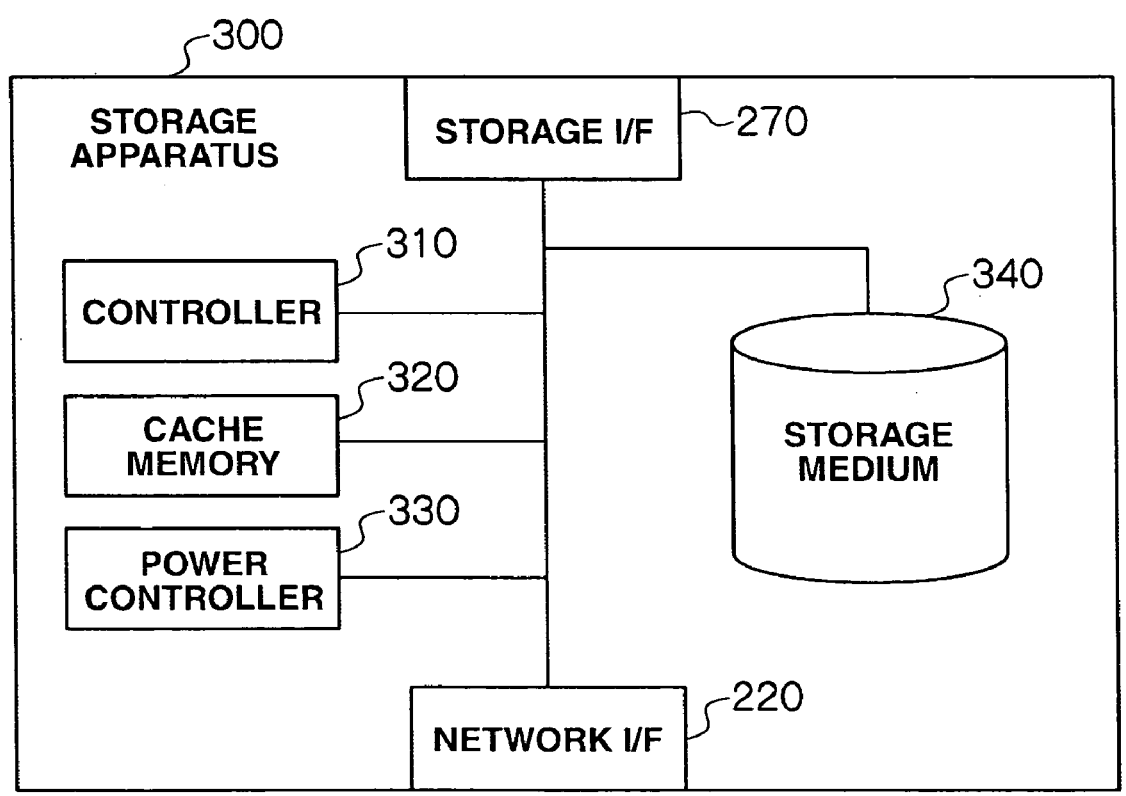
FIG. 3 is a diagram showing an example of the detailed configuration of a storage apparatus according to the above embodiment of this invention.

FIG. 3 is a diagram showing an example of the detailed configuration of the storage apparatuses 130A to 130C. Since the storage apparatuses 130A to 130C have a common configuration, they will be described as one storage apparatus 300. Note that an arbitrary storage apparatus from among the storage apparatuses 130A to 130C will also be described as the storage apparatus 300 in the below description.

The storage apparatus 300 includes a storage interface 270, a controller 310 that controls each element in the storage apparatus 300, a storage medium 340 that stores data, a cache memory 320 that temporarily stores data stored in or read from the storage medium 340, and a power controller 330 that controls the power of the storage apparatus 300.

Examples of the storage medium 340 may include a magnetic disk typified by a HDD (Hard Disk Drive), a RAID (redundant Array of Independent Disks) that uses plural HDDs in combination to provide redundancy, an optical disc and a flash memory.

The storage apparatus 300 may include a network interface 220. If the storage apparatus 300 includes the network interface 220, an administrator for the storage apparatus 300 can check or change the status of power supply and revolution speed for the storage apparatus 300 via the storage management network 155 to which the storage apparatus 300 is connected.

Figure 4:
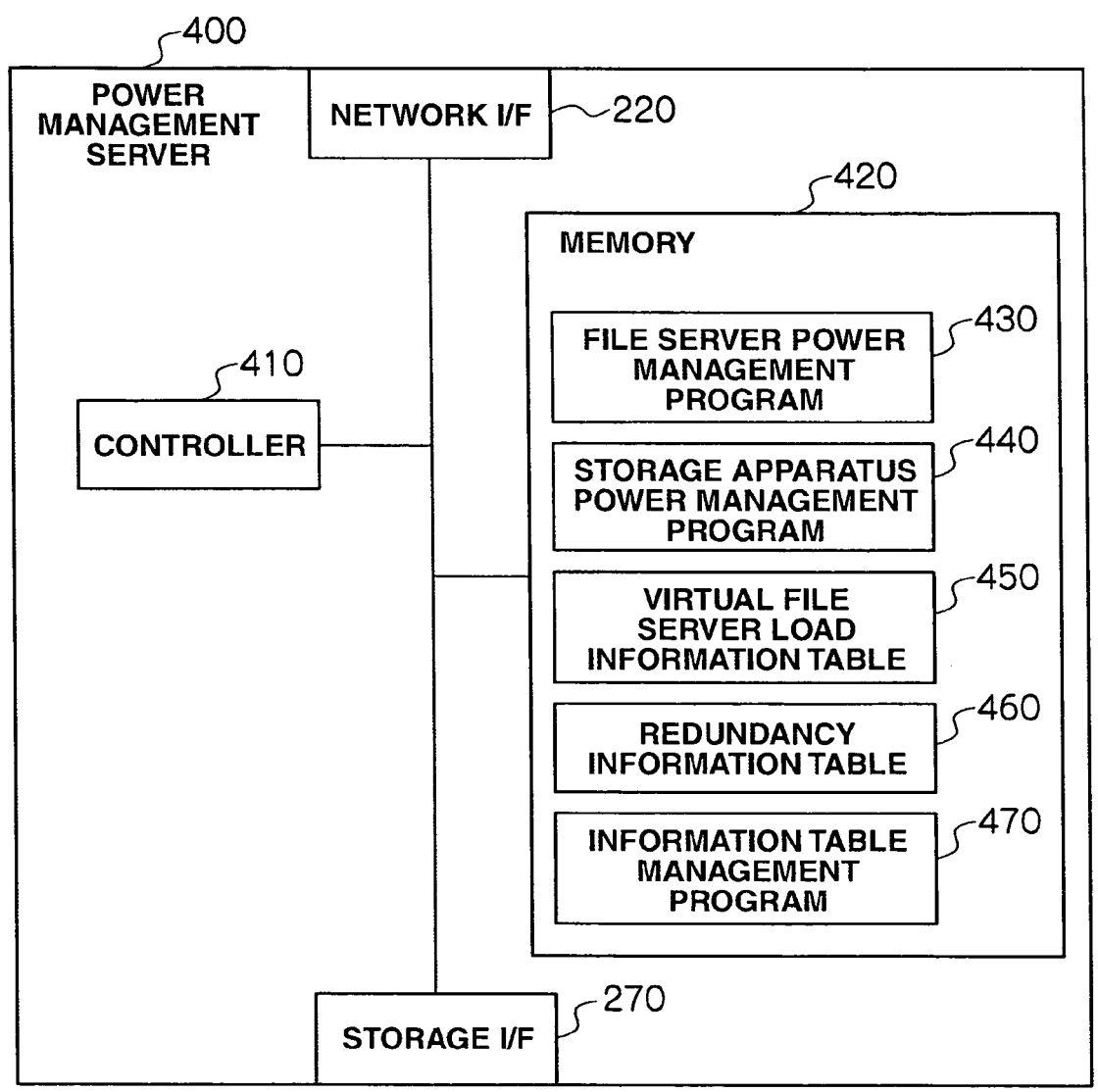
FIG. 4 is a diagram showing an example of the detailed configuration of a power management server according to the above embodiment of this invention.

FIG. 4 is a diagram showing an example of the detailed configuration of the power management server 120 in this embodiment. In FIG. 4, the power management server 120 is shown as a power management server 400. The power management server 400 includes: a controller 410 that controls each element in the power management server 400; a network interface 220 for connecting the power management server 400 to the management network 150; a memory 420 that stores programs and information; and a storage interface 270 for connecting the power management server 400 to the storage apparatuses 130A to 130C via the storage network 180.

The memory 420 includes a file server management program 430, a storage apparatus power management program 440, a virtual file server load information table 450; a redundancy information table 460 and an information table management program 470.

The controller 410 operates by interpreting the file server power management program 430 stored in the memory 420, and refers to the virtual file server load information table 450 and the redundancy information table 460 in order to judge whether or not power-on or power-off for the file server 200 can be conducted. If it is determined that the power-on or power-off can conducted, the controller 410 communicates with the power controller 280 in the file server 200 via the network interface 220, and turns on or off the file server 200.

The controller 410 operates by interpreting the storage apparatus power management program 550 stored in the memory 420, and refers to the virtual file server load information table 450 and the redundancy information table 460, communicates with the power controller 280 in the file server 200 via the network interface 220, and judges whether or not the power-on or power-off for the storage apparatus 300 can be conducted. If it is determined that the power-on or power-off is to be conducted, the controller 410 communicates with the power controller 330 in the storage apparatus 300 via the storage interface 270, and turns on or off the storage apparatus 300.

The controller 410 operates by interpreting the information table management program 470 stored in the memory 420, and communicates with the file server 200, the storage apparatus 300 and the management computer 170 via the network interface 220 and the storage interface 270, and checks or makes a change in the virtual file server load information table 450 and the redundancy information table 460 based on the communication content.

FIG. 5 is a diagram showing an example of the virtual file server load information table 450. The virtual file server load information table 450 is a table showing the load on the virtual file server for each time period. The virtual file server load information table 450 includes: a virtual file server name 510 for uniquely identifying the virtual file server 200; time periods 520 with which loads on the identified virtual file server vary; and the load 530 on the identified virtual file server in each time period 520.

For example, an entry 540A in the virtual file server load information table 450 indicates that a virtual file server named "VNAS1" operates with a load of 80% from 6:00 to 21:00 and with a load of 40% from 21:00 to 6:00.

The time period 520 is not limited to the combination of hours and minutes like in the entry 540A, and may be expressed using other forms of time such as days, dates or months.

The load 530 shows the amount of resources that the virtual file server with the virtual file server name 510 uses in the file server 200, and the amount is expressed by a percentage in relation to the entire file server 200 or by an absolute value. The load 530 can be expressed using the controller 210 and the memory 230 in the file server 200, a network band and a storage network band as the resources. A value specific to each resource in the file server 200 may be employed for expressing the load 530.

FIG. 6A is a diagram showing an example of the redundancy information table 460. The redundancy information table 460 is a table having information required for power-on and power-off processing other than the information in the virtual file server load information table 450. For example, the redundancy information table 600 shown in FIG. 6A shows, regarding various resources included in the storage system, a resource name 610, a minimum value 620, a current value 630 and a maximum value 640 for the relevant resource. The redundancy information table 600 is used in order to determine the lower limit to which the use of the resources can be reduced when the power is turned off.

Examples of the redundancy information table 600 may include a redundancy table 660 shown in FIG. 6B. The redundancy table 660 shows, regarding a virtual file server identified by a virtual file server name 670, a maximum value 680 indicating the maximum number of virtual file servers that can operate in a common file server. For example, in an entry 690A, the maximum value 680 for the virtual file server named "VNAS4" is "1." This means, in a file server in which the "VNAS4" virtual file server operates, fail-safe for another virtual file server cannot be received, and conversely, the "VNAS4" virtual file server cannot be failed over by a file server in which another virtual file server operates.

Figure 7:
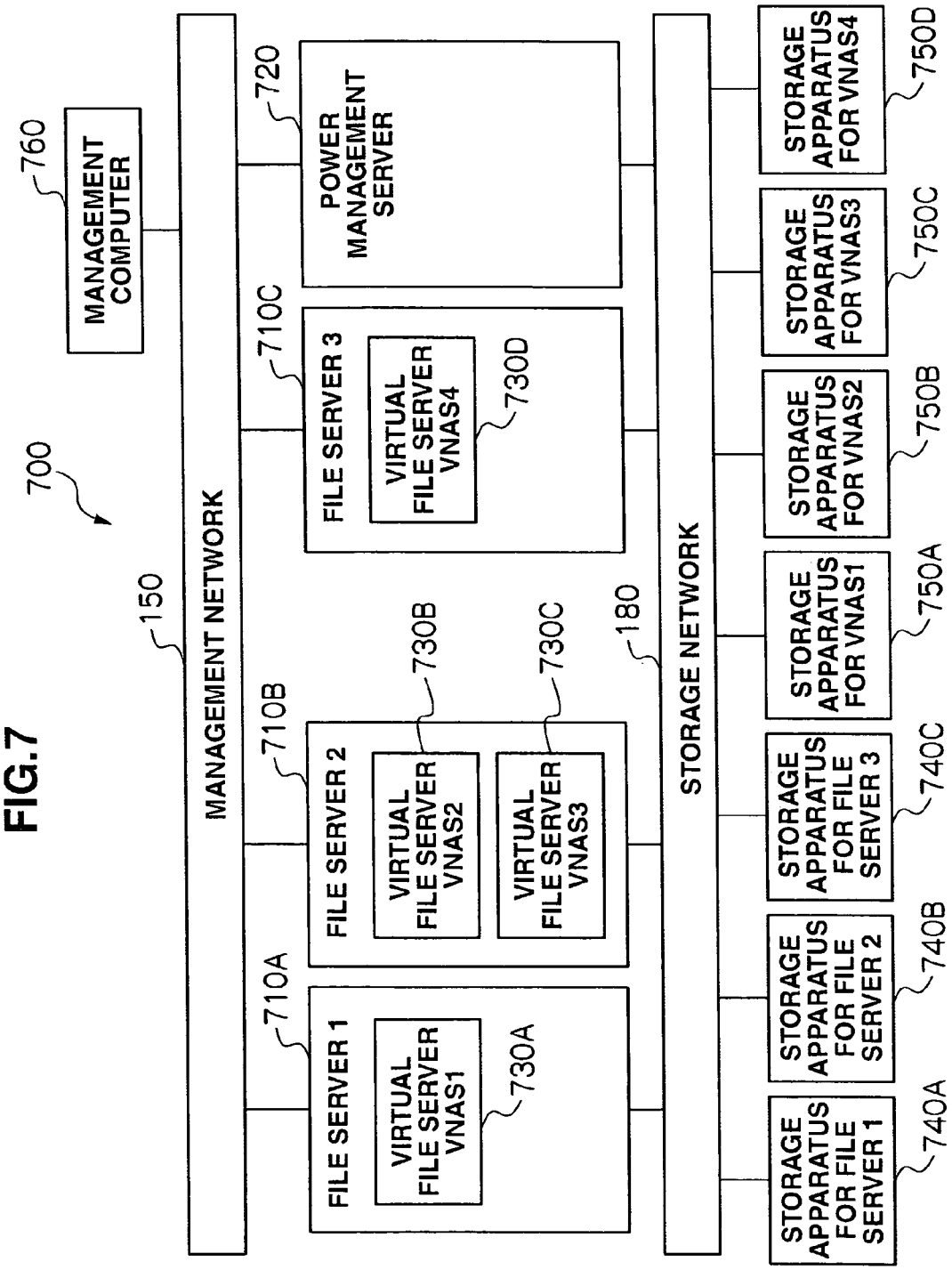
FIG. 7 is a block diagram showing an operational example of the storage system according to the above embodiment of this invention.

FIG. 7 is a block diagram showing an operational example of the storage system in this embodiment. In the storage system 700, three file servers 710A to 710C operate, and a "VNAS1" virtual server 730A operates in the file server 710A, a "VNAS2" virtual file server 730B and a "VNAS3" virtual file server 730C operate in the file server 710B, and a "VNAS4" virtual file server 730D operates in the file server 710C, so four virtual file servers 730A to 730D in total operate in the three file servers 710A to 710C.

Each of the file servers 710A to 710C, the power management server 720 and the management computer 760 can communicate with each other via the management network 150.

Each of the file servers 710A to 710C and the power management server 720 can communicate, via the storage network 180, with the storage apparatuses 740A to 740C for file servers and storage apparatuses 750A to 750D for the virtual file servers "VNAS1," "VNAS2," "VNAS3" and "VNAS4."

Figure 8:
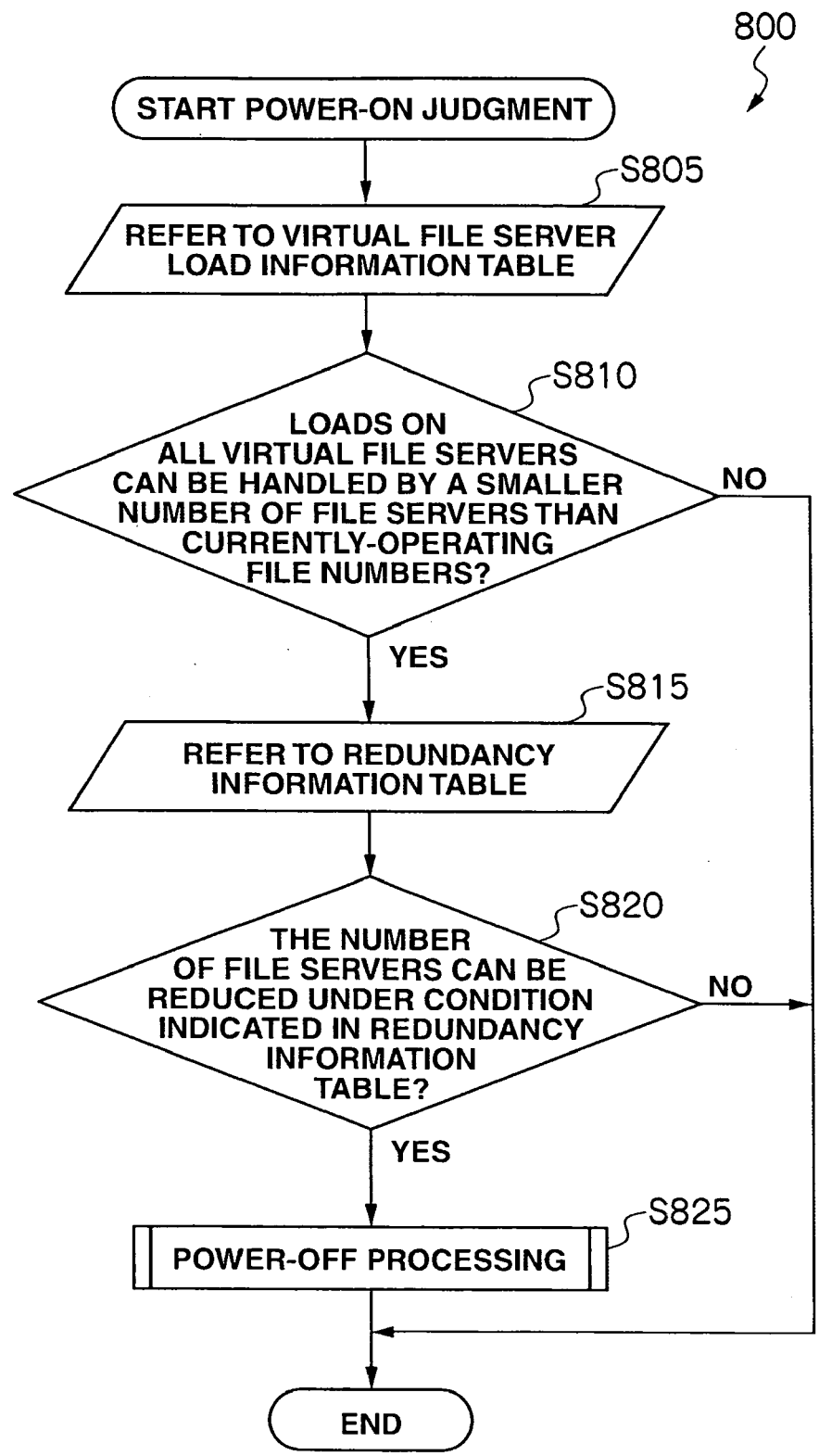
FIG. 8 is a flowchart showing power-off judgment processing for the file server according to the above embodiment of this invention.
Figure 9:
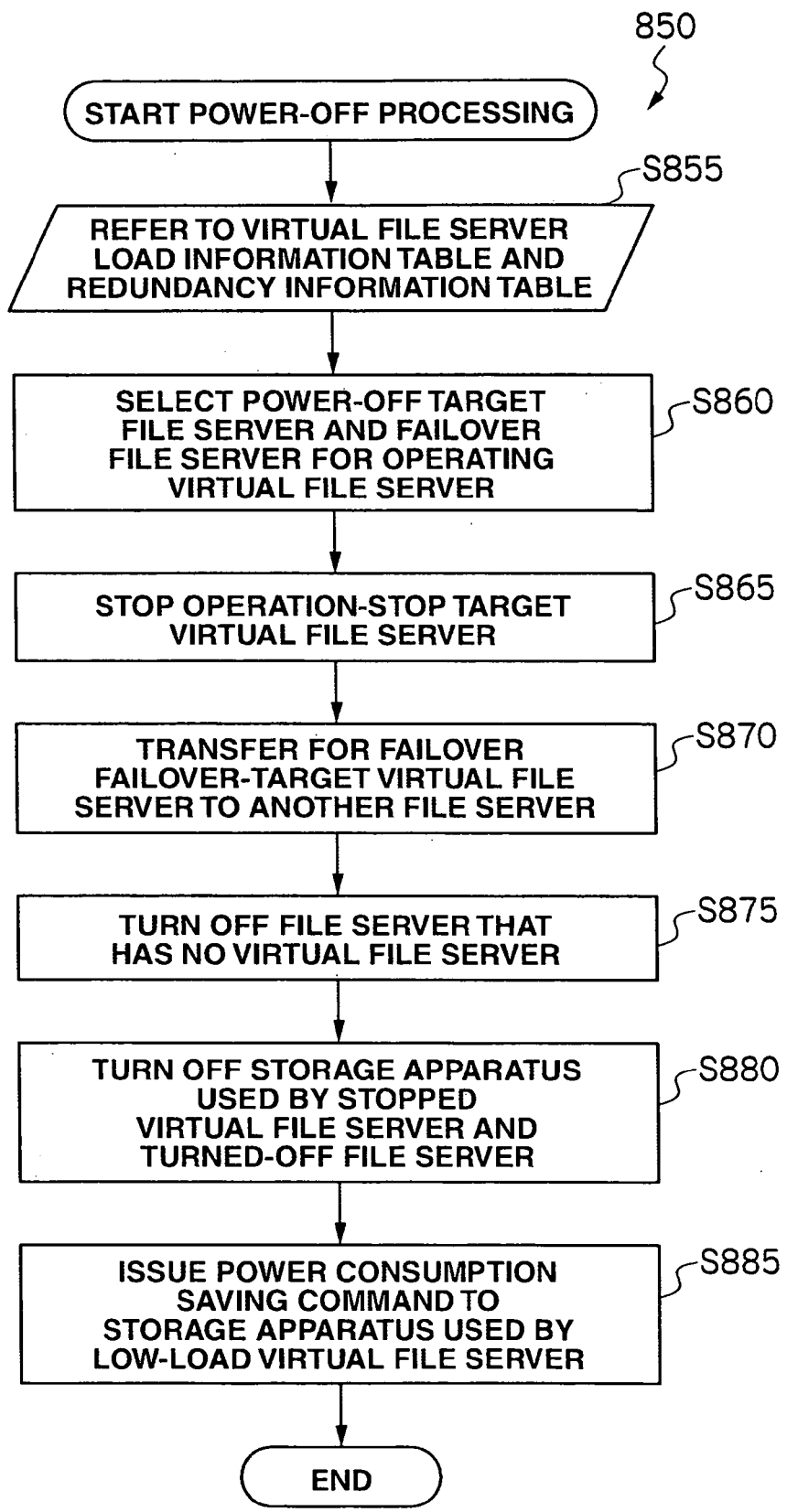
FIG. 9 is a flowchart showing power-off processing for the file server according to the above embodiment of this invention.

FIG. 8 shows a power-off judgment processing flow for the file server in this embodiment. FIG. 9 shows a power-off processing flow in this embodiment. The power management server 400 executes the power-off judgment processing flow 800 periodically or at the time when the setting for the file server or the virtual file server is changed.

The power management server 400 refers to the virtual file server load information table 450 in step S805. Then the power management server 400 judges, based on the content of the referred virtual file server load information table 450, whether or not a smaller number of file servers than the number of currently-operating file servers can handle the load on all of the virtual file servers in step S810. If the judgment result is negative, the power-off judgment processing flow 800 is terminated. For example, the virtual file server load information table 450 has the content shown in FIG. 5, the loads on the virtual file servers 730A to 730D at 5:00 are respectively 40%, 30%, 0% and 70%. Here, the total of the loads on the "VNAS1" virtual file server 730A and the "VNAS4" virtual file server 730D is 70%, so a single file server can handle their processing. The load on the "VNAS4" virtual file server 730D is 70%, so a singe file server can handle its processing. The "VNAS3" virtual file server 730C indicates a load of "0%" and is not operating. Accordingly, it can be determined that the processing of all the virtual file servers can be handled by two file servers.

If it is determined that the loads on the virtual file servers can be handled by the smaller number of file servers than the number of currently-operating file servers, the power management server 400 refers to the redundancy information table 460 in step S815. Then the power management server 400 judges whether or not the number of file servers can be reduced under the condition shown by the redundancy information table 460 in step S820. For example, the power management server 400 judges with reference to the redundancy information table 600, whether or not the number or resources will become smaller than the minimum resource number 620 if the number of operating file servers is reduced. The below description will describe an example in which the number of total network ports in all the file servers is judged when the redundancy information table 460 has the content in FIG. 6A.

The power management server 400 issues a query to each file server to acquire the number of ports (connection ports for cables) the relevant network interface 220 has. The redundancy information table 460 shows that the minimum value for the "total number of network ports for all the file servers" is 10, and three file servers have four ports, five ports and six ports respectively, i.e., 15 ports in total. Accordingly, even if the file server having four ports or that having five ports is turned off, the total number of ports is still equal to or larger than 10, so it can be determined that the above two file servers can be turned off. When it is determined that the number of file servers can be reduced, the power management server 400 performs the power-off processing and terminates the power-off judgment processing flow 800 in step S825.

The power-off processing in step S825 above will be described in more detail using a power-off processing flow 850 in FIG. 9. The power management server 400 refers to the virtual file server load information table 450 and the redundancy information table 460 in step S855 and selects a power-off target file server in step S860. The power management server 400 determines a failover file server for the virtual file server operating in the power-off target file server.

Information other than the virtual file server load information table 450 and the redundancy information table 460 may be used in order to select the power-off target file server and determine the failover file server for the virtual file server. For example, the power-off target file server may be selected so that the loads on the file servers will become equal to each other after the power-off processing or so that certain virtual file servers will not operate in the same file server.

In step S865, the power management server 400 selects, based on the virtual file server load information table 450, an operation-stop target virtual file server whose load is "0," i.e., currently not used, from the virtual file servers that operate in the power-off target file server selected in step S860, and stops its operation.

Then the power management server 400 failover, in step S870, the virtual file server operating in the power-off target file server selected in step S860 to the failover file server. In steps S865 and S870, the operations of all the virtual file servers in the power-off target file server are stopped or failed over by other file servers.

Next, the power management server 400 communicates with the power controller 280 in the power-off target file server selected in step S860 and turns off the power-off target file server in step S875.

Next, in step S880, the power management server 400 communicates with the power controllers 330 in the storage apparatuses 300 which the virtual file server having been stopped in step S865 and the power-off target file server having been tuned off in step S875 have used, and turns off these storage apparatuses 300.

Then the power management server 400 refers to the virtual file server load information table 450, determines the virtual file server with a small load 530 as being a virtual file server that uses the relevant storage apparatus with low usage frequency, then communicates with the power controller 330 in the storage apparatus 300 and issues a power consumption saving command if possible in step S885. For example, if the relevant storage apparatus 300 uses an optical disk or a magnetic disk as the storage medium 340, the power management server 400 issues a command to reduce the revolution speed of the disk in order to reduce the power consumption.

When the processing in step S885 is complete, the power management server 400 terminates the power-off processing and the power-off judgment processing.

Figure 10:
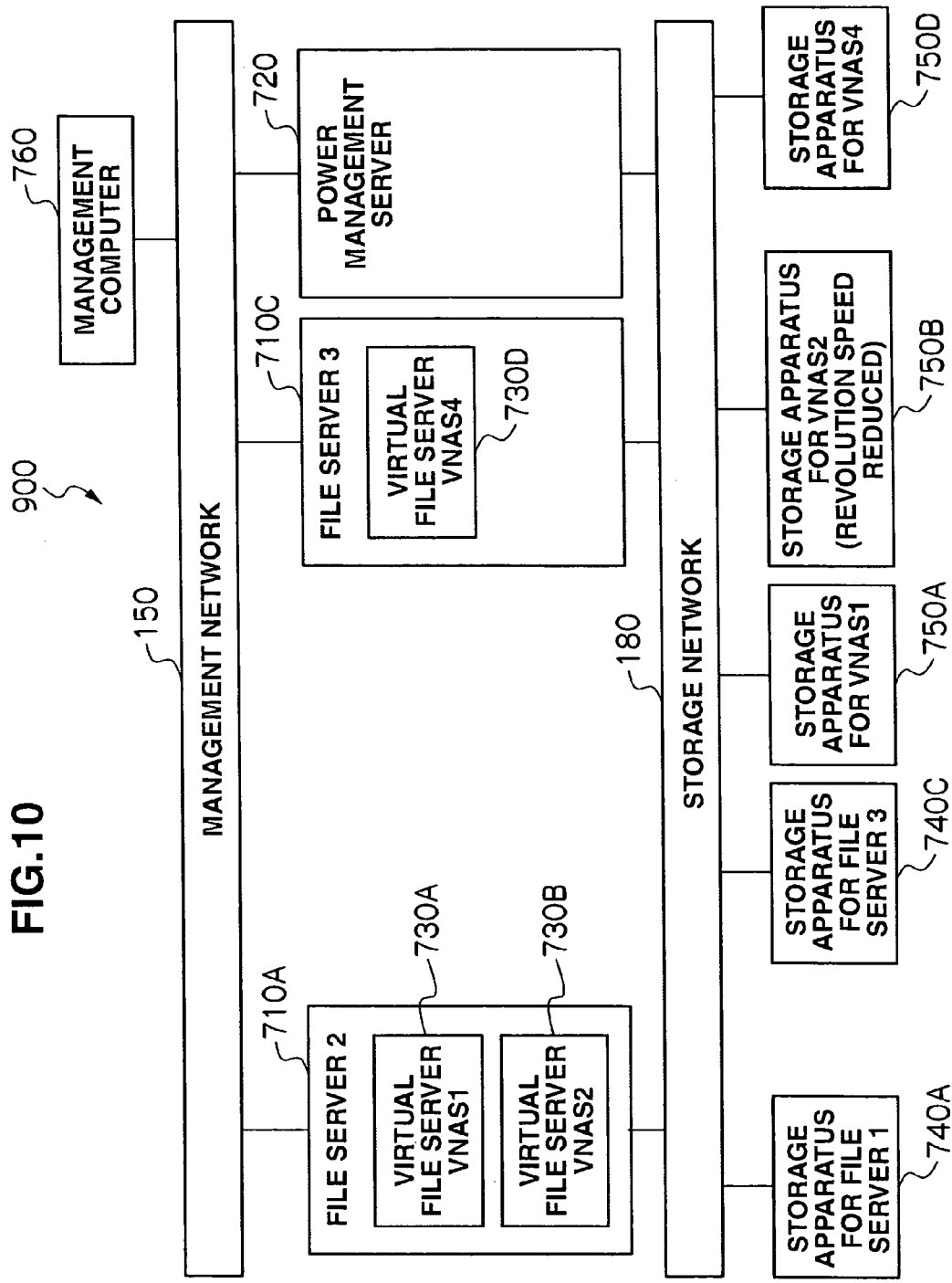
FIG. 10 is a diagram showing an operational example of the storage system after power consumption reduction processing according to the above embodiment of this invention.

FIG. 10 shows an operational example of the storage system after power consumption reduction processing in this embodiment. Suppose, in the storage system operational example 700 shown in FIG. 7, the power management server 720 has the virtual file server load information table 450 shown in FIG. 5 and the redundancy information tables 600 and 660 shown in FIG. 6.

The power management server 720 executes the power-off judgment processing flow 800 shown in FIG. 8 in the storage system operational example 700. The power management server 720 goes through the judgment processing in steps S810 and S820 and determines that the power-off processing shown in FIG. 9 can be executed after 22:00 based on the values in the time period 520 and the load 530 in the power-off judgment processing flow 800.

Then the power management server 720 selects the file server 710B whose load becomes the minimum after 22:00 as a power-off target file server in the processing in steps S855 and S860, and determines that failover is performed so that the operation of the "VNAS2" virtual file server 730B operating the file server 710B is failed over by the file server 710A and that the operation of the "VNAS3" virtual file server 730C is stopped. Here, the file server 710C might be considered as being a failover file server for the "VNAS2" virtual file server 730B, but the entry 690D in the redundancy information table 660 shows that the "VNAS4" virtual file server 730D currently operating in the file server 710C does not allow another virtual file server to operate simultaneously in the same file server 710C, so the power management server 720 does not select the file server 710C as the failover destination.

Next, the power management server 720 stops the operation of the "VNAS3" virtual file server 730C in step S865, and then makes the file server 710A fail over the "VNAS2" virtual file server 730B in the file server 710B based on the operation in step S870, and turns off the file server 710B having no virtual file server in step S875. Then the power management server 720 turns off the power of storage apparatuses 740 and 750 that have been used by the file server 710B and the "VNAS3" virtual file server 730C in step S880, and lastly issues a power consumption saving command (such as a command for reducing the revolution speed of the magnetic disk) to the storage apparatus 750C having been used by the "VNAS2" virtual file server 730B whose load after 22:00 is very low in step S885.

As a result of the above processing, components in the operating storage system are changed to those shown in a storage system 900. In the storage system 900, the number of operating file servers, virtual file servers and storage apparatuses is smaller compared to the storage system 700 before the power-off judgment processing 800, so the power consumed by these components can be reduced.

The storage system 900 can handle the load after 22:00 when the total load on the virtual file servers is small, but the loads on the "VNAS1" virtual file servers 730A and 730C increases at 6:00, and the load on the "VNAS2" virtual file server 730B also increases at 7:00, as shown in the virtual file server load information table 450 in FIG. 5. As a result, the total of the loads on the "VNAS1" virtual file server 730A and the "VNAS2" virtual file server 730B operating in the file server 710A becomes 150%, and this load cannot be handled only by the file server 710A. In addition, if the load on the "VNAS4" virtual file server 730D operating in the file server 710C is added, the total load becomes 220%, so the processing of all the virtual file servers cannot be performed by the two file servers.

Figure 11:
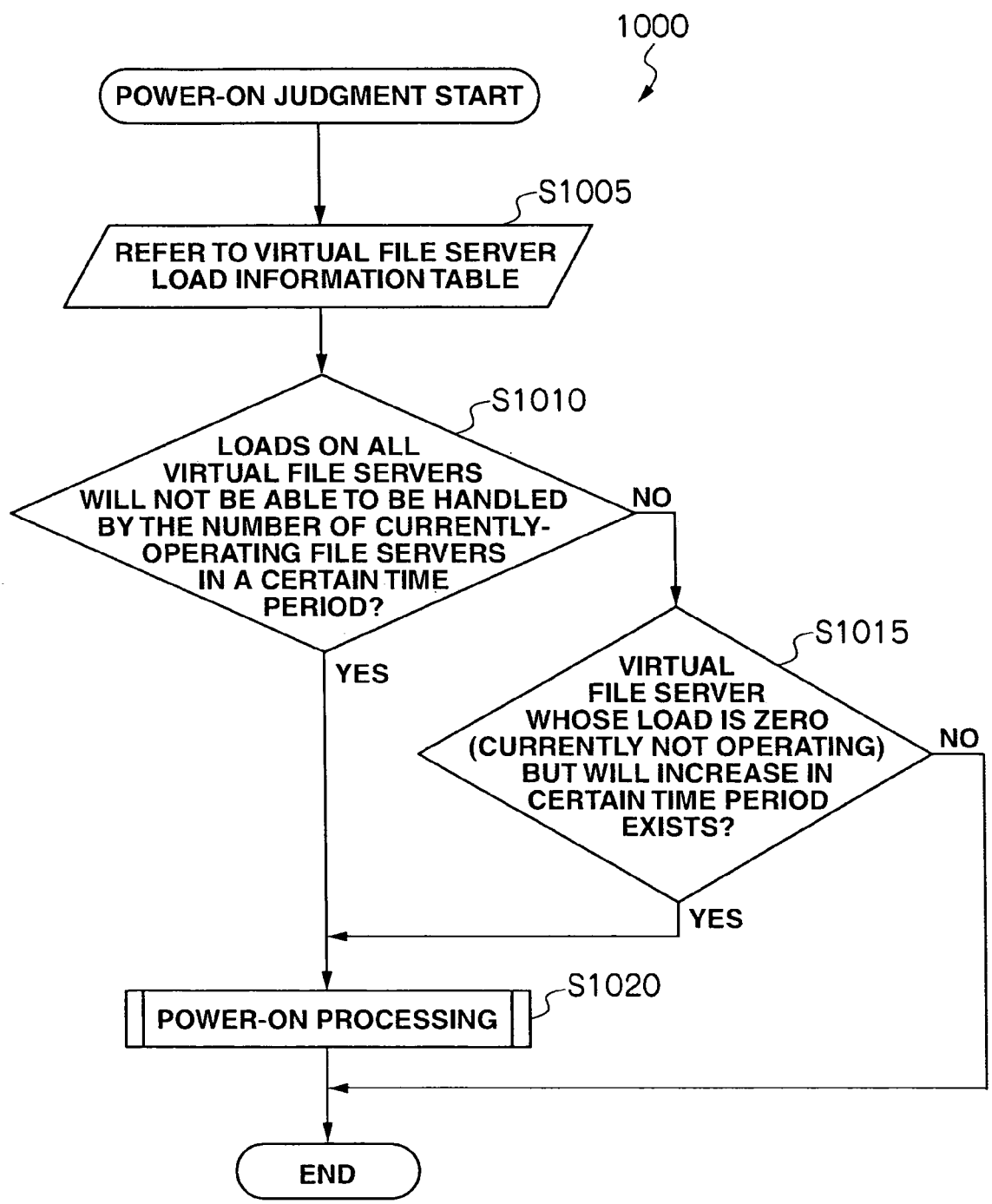
FIG. 11 is a flowchart showing power-on judgment processing for the file server according to the above embodiment of this invention.
Figure 12:
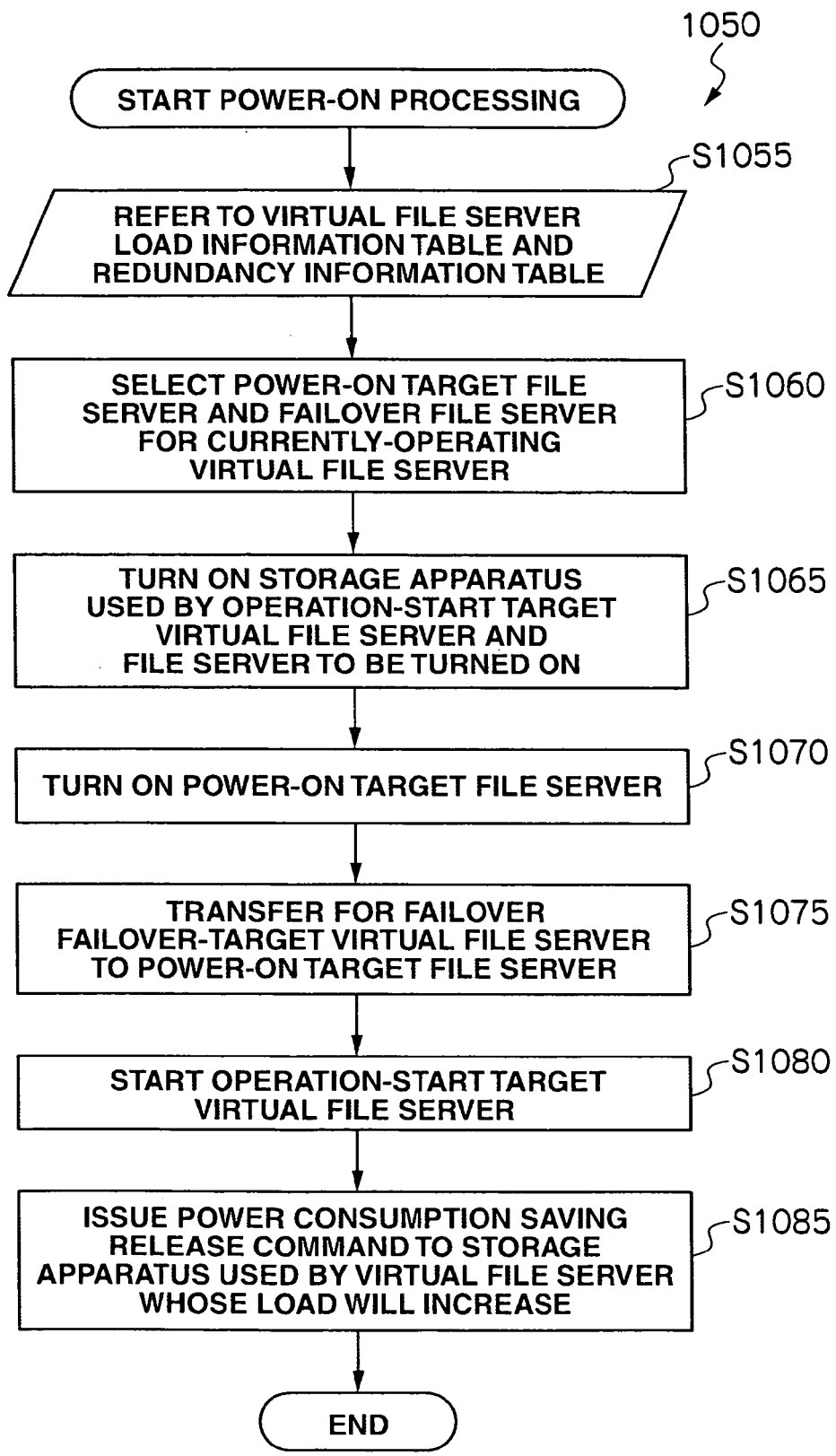
FIG. 12 is a flowchart showing power-on processing for the file server according to the above embodiment of this invention.

FIGS. 11 and 12 show solutions for the above problems. FIG. 11 is a diagram showing a power-on judgment processing flow for the file server in this embodiment. FIG. 12 is a diagram showing a power-on processing flow in this embodiment. The power management server 400 executes power-on judgment processing flow 1000 periodically or at a time when settings for the file server and the virtual file server are changed.

In the power-on judgment processing flow 1000, first, the power management server 400 refers to the virtual file server load information table 450 in step S1005. The power management server 400 judges, in step S1010, whether or not the currently-operating file server will become unable to handle the loads on all the virtual file servers in a certain period of time based on the virtual file server load information table 450. This certain time period may be arbitrarily set as long as the time is longer than the time taken to turn on the file server, to start the virtual file server and to perform failover.

If it is determined that the currently-operating file server will become unable to handle the loads on all the virtual file servers in the judgment in step S1010, the power management server 400 executes the power-on processing shown in the power-on processing flow 1050 in step S1015.

Even if it is not determined that the currently-operating file server will become unable to handle the loads on all the virtual file servers in the judgment in step S1010, the file management server 400 judges in step S1015 whether or not there is a virtual file server currently whose load is zero (currently not operating) but will increase in a certain time period. If such a virtual file server exists, the power management server 400 executes in step S1015 the power-on processing shown in the power-on processing flow 1050 in FIG. 12.

The power management server 400 refers to the virtual file server load information table 450 and the redundancy information table 460 in step S1055 and selects a power-on target file server in step S1060. The power management server 400 selects a failover-target virtual file server and a file server as a failover destination for the failover-target virtual file server for a file server in which the total of the loads on the operating virtual file servers will exceed 100% in a certain period of time, i.e., a file server that cannot handle the loads on the operating virtual file servers alone, from among the operating file servers. The power management server 400 also selects, as an operation-start target virtual file server, a virtual file server whose load is 0% (currently not operating) and will increase in a certain time period.

The power-on target file server, failover-target virtual file server and failover-destination file server in step S1060 may be selected so that the status of the file servers and virtual file servers before the power-off judgment processing flow and the power-off processing flow will be reproduced or may be selected so that they will be arranged in a different way.

Next, the management server 400 communicates with the power controllers 330 in the storage apparatus 300 that is used by the power-on target file server selected in step S1060 and the storage apparatus that will be used by the virtual file server whose load is zero (currently not operating) and will increase in a certain period, and turns on these storage apparatuses in step S1065.

Then the power storage apparatus 400 communicates with the power controller 280 in the power-on target file server selected in step S1060 and turns on the power-on target file server in step S1070.

Next, the power management server 400 failover, in step S1075, the failover-target virtual file server selected in step S1060 to the failover file server.

Then the power management server 400 starts in step S1080 the operation of the operation-start target virtual file server selected in step S1060.

Lastly, the power management server 400 communicates with the power controller 330 in the storage apparatus 300 that is used by the virtual file server whose load will increase in a certain time period from among the virtual file servers using the storage apparatuses 300 that have received the power consumption saving command, and issues a command for stopping the power consumption saving mode.

The power management server 400 performs the power-on judgment processing and the power-on processing as described above.

The below description will describe an example in which the power-on judgment processing and the power-on processing are performed for the storage system 900 shown in FIG. 10. The power management server 720 executes the power-on judgment processing flow 1000 shown in FIG. 11 on the storage system operational example 900. According to the power-on judgment processing flow 1000, the power management server 720 determines that the power-on processing shown in FIG. 12 can be executed based on the values in the time period 520 and the load 530 and the judgment processing in step S1010 when 6:00 approaches.

For example, the power management server 720 selects in steps S1055 and S1060 the "VNAS3" virtual file server 730C as the operation-start target virtual file server, the "VNAS2" virtual file server 730B as the failover-target virtual file server and the file server 710B as the power-on target file server and as the failover file server for the "VNAS2" virtual file server 730B so that the configuration of the storage system 900 after the power-off processing will become the same as that in the storage system 700 before the power-off processing.

Next, the power management server 720 turns on the storage apparatuses 740B and 750C whose operations have been stopped in step S1065, and turns on the file server 710B in step S1070. The power management server 720 makes, in step S1075, the file server 710A fail over the "VNAS2" failover-target virtual file server 730B selected in step S1060 in the failover file server 710B. Then the power management server 720 starts, in step S1080, the operation of the "VNAS3" virtual file server 730C selected in step S1060. Lastly, the power management server 720 cancels, in step S1085, the power consumption saving command for the storage apparatus 750B used by the "VNAS2" virtual file server 730B whose load will increase in the certain time period.

As a result of the above processing, the configuration of the storage system 900 after the power-off processing is returned to a configuration same as that in the storage system 700 before the power-off processing, so the three file servers can handle the loads on the four virtual file servers after 7:00.

Plural practical examples may be applied in creating and editing the virtual file server load information table 450 and the redundancy information table 460.

In one practical example, the virtual file server communicates with the information table management program 470 in the power management server 400 via the management network 150, and the virtual file server itself can create and edit the virtual file server load information table 450 and the redundancy information table 460.

In another practical example, each file server 200 monitors the virtual file server operating in the relevant file server 200 for its usage frequency of the network interface 220, the storage interface 270 and the controller 210, creates statistical information for each time period, and communicates with the information table management program 470 in the power management server 400 via the management network 150, so the virtual file server itself can create or edit entries in the virtual file server load information table 450 and the redundancy information table 460 based on the statistical information.

In another practical example, each file server 200 refers to the server function management information 275 for the virtual file server operating in the relevant file server 200, acquires the operation status of the virtual file server for each time period, and communicates with the information table management program 470 in the power management server 400 via the management network 150, so the virtual file server itself can create or edit entries in the virtual file server load information table 450 and the redundancy information table 460 based on the above operation status information.

In another practical example, the management computer 170 presents for a user a virtual file server information table edit interface (to be described later) using a GUI (Graphical User Interface) or a CUI (Character User Interface). When the administrator of the storage system 100 operates that interface via the management computer 170, the management computer 170 communicates with the information table management program 470 in the power management server 400 via the management network 150 based on the above operation, so the administrator can create or edit entries in the virtual file server load information table 450 and the redundancy information table 460.

Figure 13:
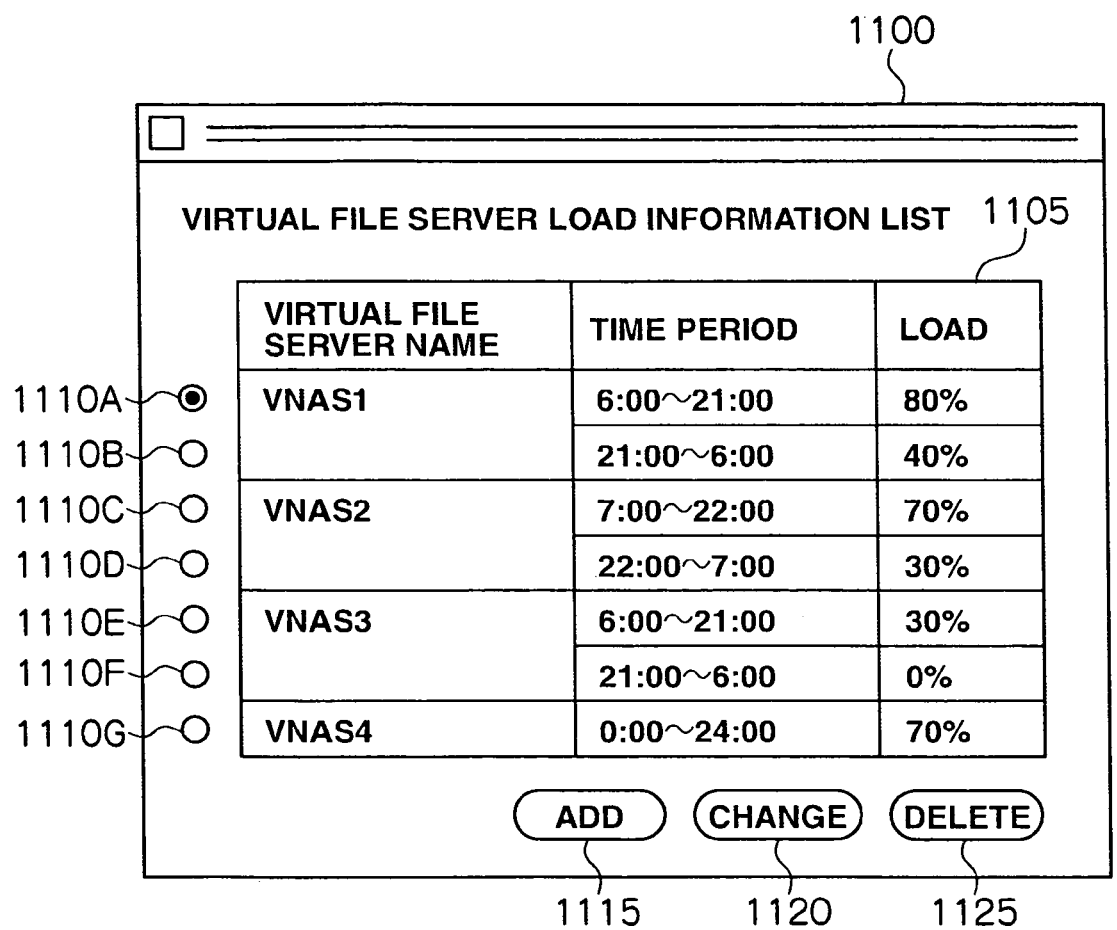
FIG. 13 is a diagram showing an example of a virtual file server information table edit interface for a user according to the above embodiment of this invention.
Figure 14:
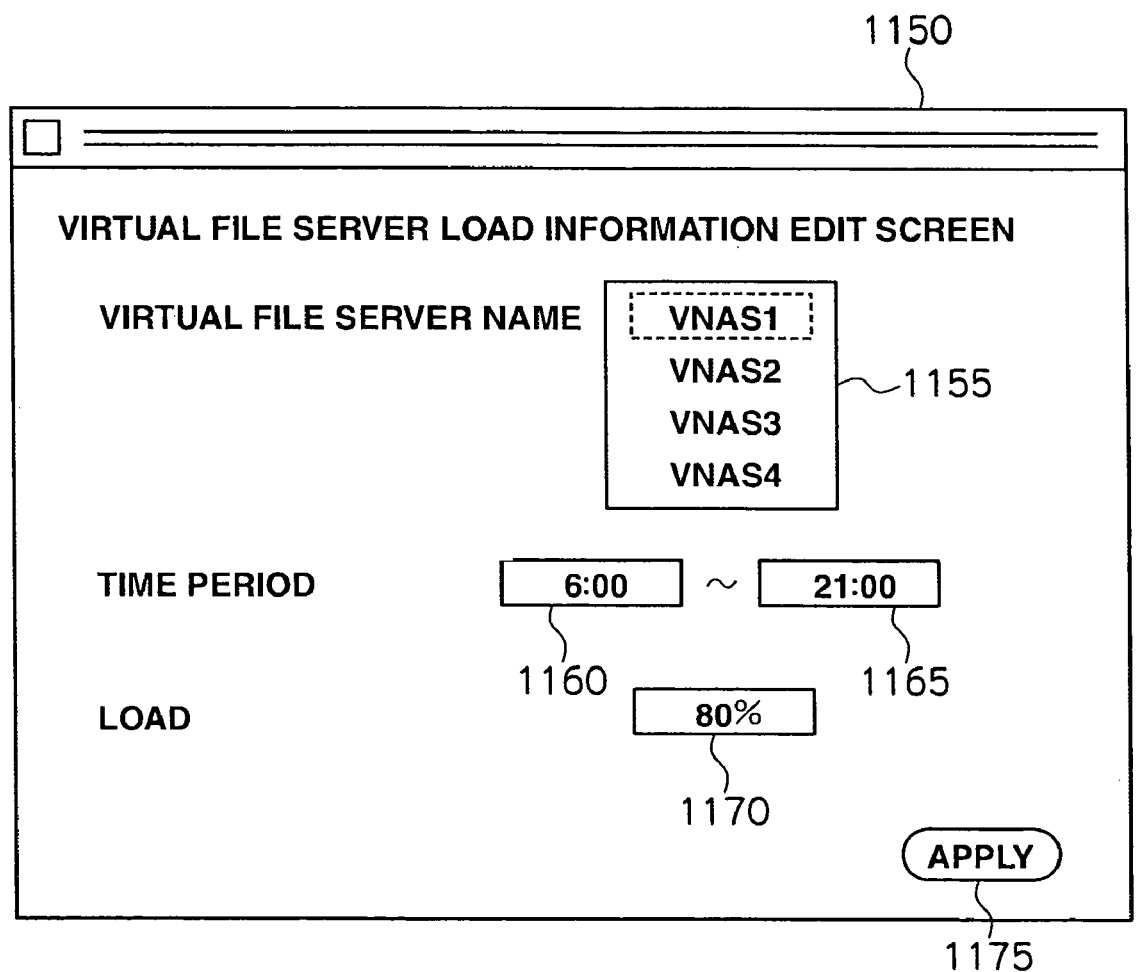
FIG. 14 is a diagram showing an example of a virtual file server information table edit interface for a user according to the above embodiment of this invention.

FIGS. 13 and 14 show examples of the virtual file server information table edit interface for a user in this embodiment. A virtual file server load information list screen 1100 includes a current virtual file server load information table 1105, selection buttons 1110A to 1110G corresponding respectively to entries in the virtual file server load information table 1105, an addition processing button 1115, a change processing button 1120 and a deletion processing button 1125.

When the administrator clicks on the addition processing button 1115 or the change processing button 1120, a virtual file server load information edit screen 1150 shown in FIG. 14 is displayed. When the administrator clicks on the deletion processing button 1125, a virtual file server load information table 1105 entry that corresponds to a currently-selected button in the selection buttons 1110A to 1110G is deleted.

The virtual file server load information edit screen 1150 includes a virtual file server name selection field 1155, a start time input field 1160, an end time input field 1165, a load input field 1170 and an 'apply' button 1175.

The administrator can edit, in the virtual file server load information edit screen 1150, an entry in the virtual file server load information table 450 by selecting a target virtual file server for load information editing from the virtual file server name selection filed 1155, inputting values in the start item input field 1160, the end time input field 1165 and the load input field 1170 for the load on the target virtual file server, and clicking on the 'apply' button 1175.

When the 'apply' button 1175 is clicked on, if the virtual file server load information edit screen 1150 has been displayed as a result of the clicking operation on the addition processing button 1115, an entry having the information in the virtual file server name selection field 1155, the start time input field 1160, the end time input field 1165 and the load input field 1170 is added to the virtual file server load information table 450.

When the 'apply' button 1175 is clicked on, if the virtual file server load information edit screen 1150 has been displayed as a result of the clicking operation on the change processing button 1120, the virtual file server load information table 1105 entry that corresponds to the currently-selected selection button from among the selection buttons 110A to 1110G in the virtual file server load information table 450 is replaced by the information in the virtual file server name selection field 1155, the start time input field 1160, the end time input field 1165 and the load input field 1170.

FIG. 15 is a diagram showing an example of an edit interface for the redundancy information table 460. A redundancy information list screen 1200 includes a current redundancy information table 1205, selection buttons 1210A to 1210D corresponding respectively to entries in the redundancy information table 1205, an addition processing button 1215, a change processing button 1220 and a deletion processing button 1225.

When the administrator clicks on the addition processing button 1215 or the change processing button 1220, a redundancy information edit screen 1250 is displayed. When the administrator clicks on the deletion processing button 1225, a redundancy information table 1205 entry corresponding to the currently-selected selection button from among the section buttons 1210A to 1210D is deleted.

Figure 16:
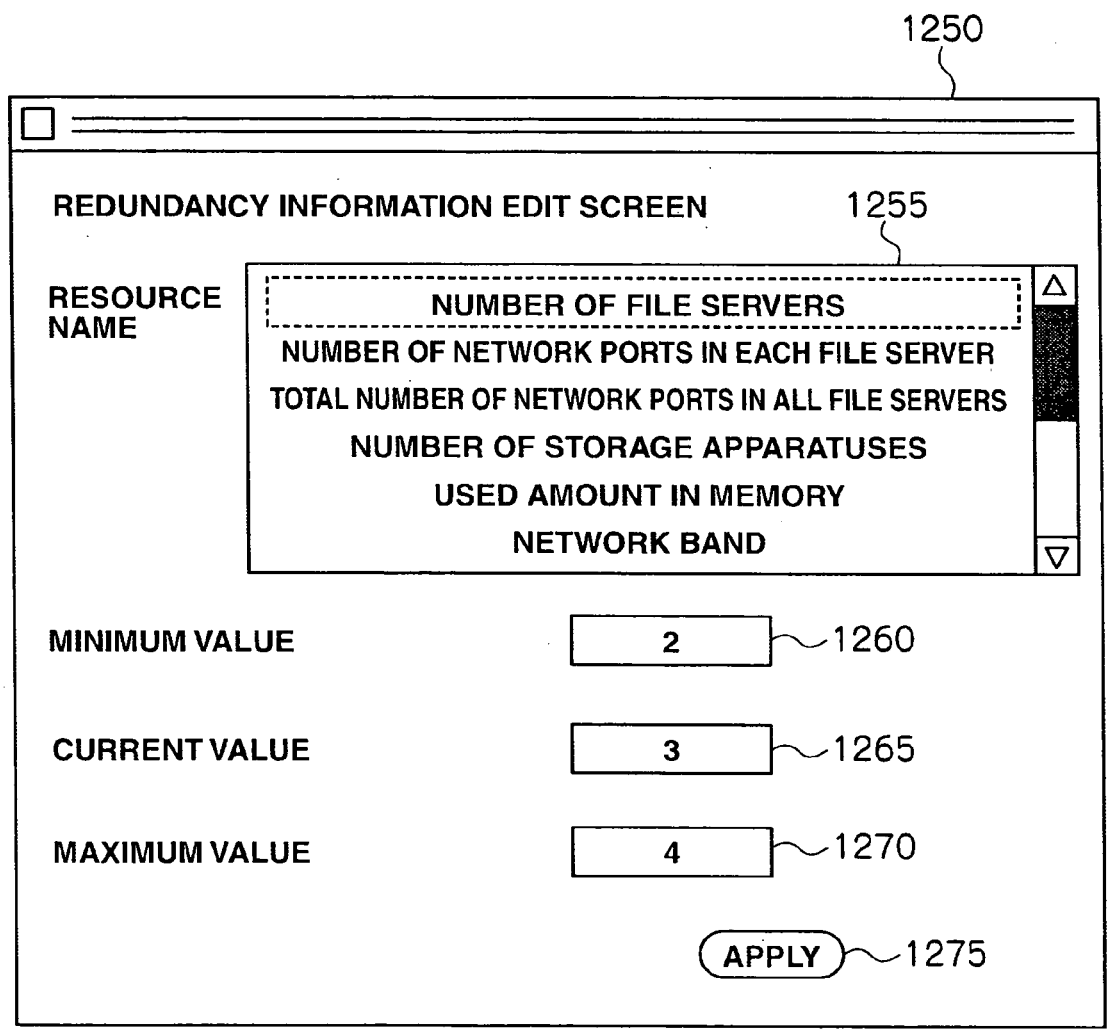
FIG. 16 is a diagram showing an example of a redundancy information table edit interface according to the above embodiment of this invention.

The redundancy information edit screen 1250 shown in FIG. 16 includes a resource name selection field 1255, a minimum value input field 1260, a current value input field 1265 and a maximum value input field 1270 for resources, and an 'apply' button 1275.

The administrator can edit, in the redundancy information edit screen 1250, an entry in the redundancy information table 460 by selecting a target resource for redundancy information setting from the resource selection field 125, inputting values in the minimum value input field 1260, the current value input field 1265 and the maximum value input field 1270 for the target resource, and clicking on the 'apply' button 1275.

However, for some resources, the administrator is not allowed to input values in the minimum value input field 1260, the current value input field 1265 and the maximum value input field 1270, since they are automatically set depending on the configuration of the storage system. For example, the maximum number for the resource "file servers" is constantly consistent with the number of file servers included in the current storage system and cannot be changed.

When the 'apply' button 1275 is clicked on, if the redundancy information edit screen 1250 has been displayed as a result of the clicking operation of the addition processing button 1215, an entry having the information indicated in the resource selection field 1255, the minimum value input field 1260, the current value input field 1265 and the maximum value input field 1270 for the relevant resource is added to the redundancy information table 460.

When the 'apply' button 1275 is clicked on, if the redundancy information edit screen 1250 has been displayed as a result of clicking on the change processing button 1220, a redundancy information table 460 entry corresponding to the currently-selected selection button from among the selected buttons 1210A to 1210D is replaced by the information shown in the resource selection field 1255 and the minimum value input field 1260, the current value input field 1265 and the maximum value input field 1270 for the relevant resource, Another practical example for managing power for virtual file servers will be described. In the storage system 100, the storage apparatuses 130A to 130C are not necessarily managed by the same administrator as the administrator of the file servers 190A to 190C. If the storage apparatuses 130A to 130C are managed by a different administrator, the storage apparatuses 130A to 130C might be turned on or turned off by the administrator of the storage apparatuses 130A to 130C. In such a case, unnecessary power consumption can be reduced by starting or stopping the operation of the file servers 190A to 190C and the virtual file servers 110A to 110C in accordance with the power status of the storage apparatuses 130A to 130C.

Figure 17:
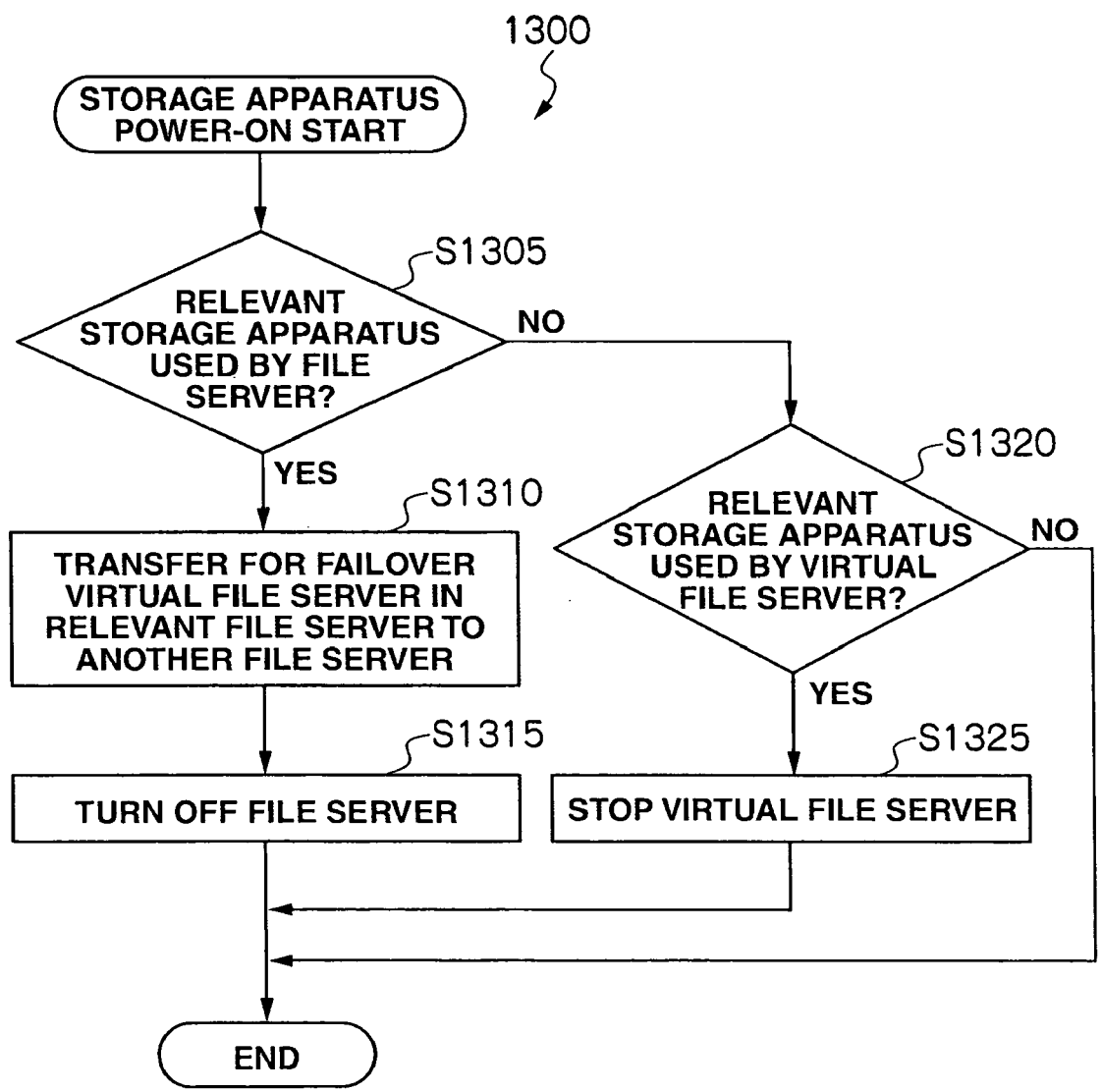
FIG. 17 is a flowchart showing operation stop processing for the file server and the virtual file server performed by a power management server according to the above embodiment of this invention.

FIG. 17 shows a file server/virtual file server operation stop processing flow 1300 performed by the power management server 400 when the administrator operates the storage apparatus management computer 175 and issues a command for turning off the storage apparatuses 130A to 130C via the storage management network 155.

If the power management server 400 determines that the power-off target storage apparatus is used by a file server in step S1305, the power management server 400 makes another file server fail over the virtual file server operating in this file server in step 1310. Then the power management server 400 turns off the file server in step S1315.

On the other hand, if the power management server determines that the power-off target storage apparatus is not used by any file server in step S1305, the power management server 400 performs the processing in step S1320.

If the power management server 400 determines that the power-off target storage apparatus is used by a virtual file server in step S1320, the power management server 400 stops the operation of this virtual file server in step S1325.

By performing the above file server/virtual file server operation stop processing 1300, the power management server 400 can stop the operations of the file server and the virtual file server using the power-off target storage apparatus, so the power consumption of the entire storage system 100 can be reduced.

Figure 18:
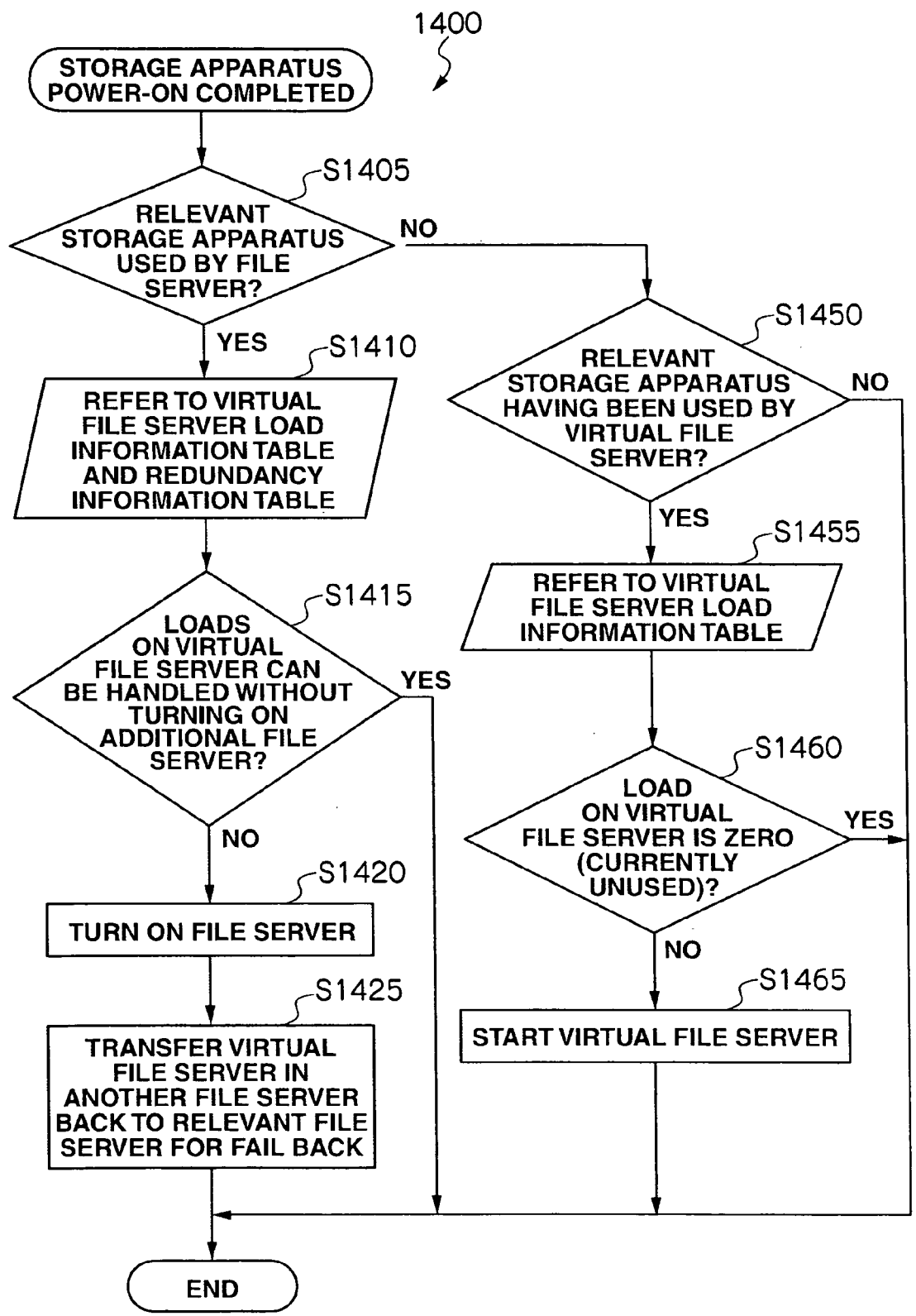
FIG. 18 is a flowchart showing operation start processing for the file server and the virtual file server performed by a power management server according to the above embodiment of this invention.

FIG. 18 shows a file server/virtual file server operation start processing flow 1400 performed by the power management server 400 when the administrator issues a power-on command for the storage apparatuses 130A to 130C and after the power-on processing for the storage apparatuses is complete.

When the power management server 400 determines that the power-on target storage apparatus is used by a file server in step S1405, the power management server 400 refers to the virtual file server load information table 450 and the redundancy information table 460 in step S1410, and judges whether or not the number of the currently-operating file servers can handle the loads on all the virtual file servers in order to determine if the file server that uses the power-on target storage apparatus needs to be operated in step S1415. Here, it may be determined that the file server needs to be operated, even if the currently-operating file servers can handle the loads on all the virtual file servers for the purpose of dispersing the loads or providing redundancy.

If the power management server 400 determines that the file server needs to be operated in step S1415, the power management server 40 turns on the relevant file server in step S1420, and makes the virtual file server, which has been failed over by another file server in step S1310, be failed back to the relevant file server in step S1425. Step S1425 is not necessarily performed, so if the power management server determines that this step is not necessary after referring to the virtual file server load information table 450 and the redundancy information table 460, this step can be omitted.

If the power management server 400 determines that the relevant storage apparatus is not used by a file server in step S1405 and determines that the relevant storage apparatus is used by a virtual file server in step S1450, the power management server 400 refers to the virtual file server load information table 450 in step S1455 and judges whether or not the load on the relevant file server is zero (i.e., the virtual vile server is unused) in step S1460. If it is determined that the virtual file server is used, the power management server 400 starts the operation of the virtual file server.

This invention can be widely applied in storage systems and power consumption reduction methods for the storage systems.

While the invention has been described with respect to a limited number of embodiments, those skilled in the art, having the benefit of this disclosure, will appreciate that other embodiments can be devised that do not depart from the scope of the invention as disclosed herein. Accordingly, the scope of the invention should be limited only by the attached claims.

What is claimed is:

1. A storage system, comprising:
   at least one storage apparatus that includes a first power control mechanism;
   at least one computer that includes a controller for storing a file in the storage apparatus, a second power control mechanism and a virtual file server that issues start, stop and failover commands; and
   a power management computer that controls the first power control mechanism and the second power control mechanism,
   wherein the power management computer includes a first shift controller that: refers to a load on the computer; stops the virtual file server or performs failover for the virtual file server when the load is low; and shifts the states of the first power control mechanism in the storage apparatus and the second power control mechanism in the computer to a power-off state or a low power consumption state.

2. The storage system according to claim 1, wherein the power management computer includes a second shift controller that: refers to the load on the computer; turns on the first power control mechanism in the storage apparatus and the second power control mechanism in the computer or cancels their low power consumption state, when the load will increase in a certain time period; and starts the virtual file server or performs failover for the virtual file server.

3. The storage system according to claim 2, wherein:
   the power management computer includes a memory;
   the memory stores: a virtual file server load information table in which time periods and loads regarding the virtual file server are listed; and a redundancy information table in which a minimum value and a maximum value for each resource included in the storage system can be specified; and
   the first shift controller and the second shift controller refer to the virtual file server load information table and the redundancy information table and respectively perform shift control.

4. The storage system according to claim 2, further comprising:
   a storage apparatus management computer that issues a power-on or power-off command for the first power control mechanism in the storage apparatus, wherein:
      when the power-on or power-off command is issued from the storage apparatus management computer, the power management computer starts or stops the computer and the virtual file server that uses a power-on/power-off target storage apparatus.

5. The storage system according to claim 3, wherein the first shift controller judges whether or not the load on the virtual file server can be handled by a smaller number of computers than the number of currently-operating computers, and if the judgment result is positive, the first shift controller stops the virtual file server or performs failover for the virtual file server, and shifts the states of the first power control mechanism in the storage apparatus and the second power control mechanism in the computer to the power-off state or the low power consumption state.

6. The storage system according to claim 5, wherein:
   the first shift controller refers to the virtual file server load information table, calculates the total of a load on each virtual file server during the shift, and judges whether or not the calculated total load can be handled by a smaller number of computers than the total number of the currently-operating computers.

7. The storage system according to claim 5, wherein:
   each resource in the redundancy information table includes the number of network ports in the computer;
   if it is determined as a result of the judgment that the load can be handled, the first shift controller calculates the total number of network ports in the computers and shifts the state of the second power control mechanism in the computer to a power-off or low power consumption state based on comparison between the calculated number of network ports and the minimum number of network ports in the computers which is stored in the redundancy information table.

8. The storage system according to claim 3, wherein the second shift controller judges whether or not the load on the virtual file server will be able to be handled by all the currently-operating computers after a certain time period, and if the judgment result is negative, the second shift controller turns on the power for the first power control mechanism in the storage apparatus and the second power control mechanism in the computer or cancels their low power consumption state, and starts the virtual file server or performs failover for the virtual file server.

9. The storage system according to claim 3, wherein:
   the power management computer includes an information table management unit; and
   the virtual file server communicates with the information table management unit and makes a change in the virtual file server load information table.

10. The storage system according to claim 3, wherein:
    the power management computer includes an information table management unit;
    the computer monitors a resource usage status for the virtual file server for each time period, communicates with the information table management unit and makes a change in the virtual file server load information table.

11. The storage system according to claim 3, wherein:
    the power management computer includes an information table management unit; and
    the computer collects the load in each time period based on setting information for each virtual file server, communicates the information table management unit and changes the virtual file server load information table.

12. The storage system according to claim 3, further comprising:
    a management computer that can be connected via the network, wherein:
       the management computer includes an information table management unit; and
       when the editing of display content based on content displayed on the management computer is commanded, the management computer makes a change in the virtual file server load information table by communicating with the information table management unit and transmitting the commanded edit content to the power management computer.

13. The storage system according to claim 3, wherein:
    the power management computer includes information table management unit; and the virtual file server makes a change in the redundancy information table by communicating with the information table management unit.

14. The storage system according to claim 3, wherein:
the power management computer includes an information table management unit; and
the computer monitors a resource usage status for the virtual file server in each time period, communicates with the information table management unit and makes a change in the redundancy information table.

15. The storage system according to claim 3, wherein:
the power management computer includes an information table management unit; and
the computer collects a resource usage status in each time period based on setting information for each virtual file server, communicates with the information table management unit and makes a change in the redundancy information table.

16. The storage system according to claim 3, further comprising:
a management computer that can be connected via a network;
the power management computer includes an information table management unit; and
when the editing of display content based on content displayed on the management computer is commanded, the management computer makes a change in the redundancy information table by communicating with the information table management unit and transmitting the commanded edit content to the power management computer.

17. A power consumption reduction method for a storage system that includes: at least one storage apparatus including a first power control mechanism; at least one computer including a controller for storing a file in the storage apparatus, a second power control mechanism and a virtual file server for issuing start, stop and failover commands; and a power management computer that controls the first power management mechanism and the second power management mechanism, the method comprising steps performed by the power management computer, the steps being:
referring to a load on the computer; and
stopping the virtual file server or performing failover for the virtual file server when the load is low, and shifting the states of the first power control mechanism in the storage apparatus and the second power control mechanism in the computer to a power-off state or a low power consumption state.

18. The method according to claim 17, wherein
the power management computer refers to the load on the computer, and if the load will increase in a certain time period, the power management computer turns on the first power control mechanism in the storage apparatus and the second power control mechanism in the computer or cancels their low power consumption state, and starts the virtual file server or performs failover for the virtual file server.

19. The method according to claim 18, wherein:
the storage system includes a storage apparatus management computer that issues a power-on or power-off command for the first power control mechanism in the storage apparatus, and
if the storage apparatus management computer issues a power-on or power-off command, the power management computer starts or stops a computer and a virtual file server that uses a power-on/power-off target storage apparatus.

* * * * *